United States Patent
Fenn et al.

[11] Patent Number: 5,910,985
[45] Date of Patent: Jun. 8, 1999

[54] GROUND START AND TIP GROUND DETECTION WITHOUT THE USE OF -48V OR TIP BAIT CIRCUIT

[75] Inventors: Thomas Fenn, San Jose; Brian Robert Carey, Cupertino, both of Calif.

[73] Assignee: Siemens Information and Communication Networks, Inc., Boca Raton, Fla.

[21] Appl. No.: 08/880,334

[22] Filed: Jun. 23, 1997

[51] Int. Cl.[6] .................................................. H04M 1/00
[52] U.S. Cl. ........................................... 379/382; 379/377
[58] Field of Search .................................. 379/377, 399, 379/382, 413

[56] References Cited

U.S. PATENT DOCUMENTS

| | | | |
|---|---|---|---|
| Re. 30,220 | 2/1980 | O'Neill | 379/162 |
| 4,099,032 | 7/1978 | Roge et al. | 379/378 |
| 4,176,255 | 11/1979 | Rudisill, Jr. | 379/413 |
| 4,221,936 | 9/1980 | Vaughan | 379/377 |
| 4,282,408 | 8/1981 | Stauers | 379/379 |
| 4,310,725 | 1/1982 | Mehaffey | 379/231 |
| 4,326,104 | 4/1982 | Bergida | 379/379 |
| 4,535,201 | 8/1985 | Kasbia et al. | 379/377 |
| 4,631,362 | 12/1986 | Arntsen et al. | 379/384 |
| 4,796,290 | 1/1989 | Perry | 379/27 |
| 5,003,573 | 3/1991 | Agah et al. | 379/27 |
| 5,258,721 | 11/1993 | Zanders | 327/18 |
| 5,734,170 | 3/1998 | Ikeda | 250/551 |

*Primary Examiner*—Reinhard J. Eisenzopf
*Assistant Examiner*—Charles N. Appiah

[57] ABSTRACT

A loop detector circuit for detecting the loop current of a telephone circuit in a ground start mode and a normal mode which obviates the need for a separate TIP ground detector circuit. A pair of light emitting diodes (LED) 52, 54 are associated with a photoelectric device, such as a phototransistor 56, 58, connected across TIP and RING with a series resistor. Each resistor 60, 62, is selected to provide a predetermined voltage drop during a ground start mode and a normal mode, thus enabling the loop detector to detect loop current during both modes. The loop detector circuit is thus able to detect the off-hook status of a subscriber handset during a ground start mode without the use of a separate TIP ground circuit.

16 Claims, 2 Drawing Sheets

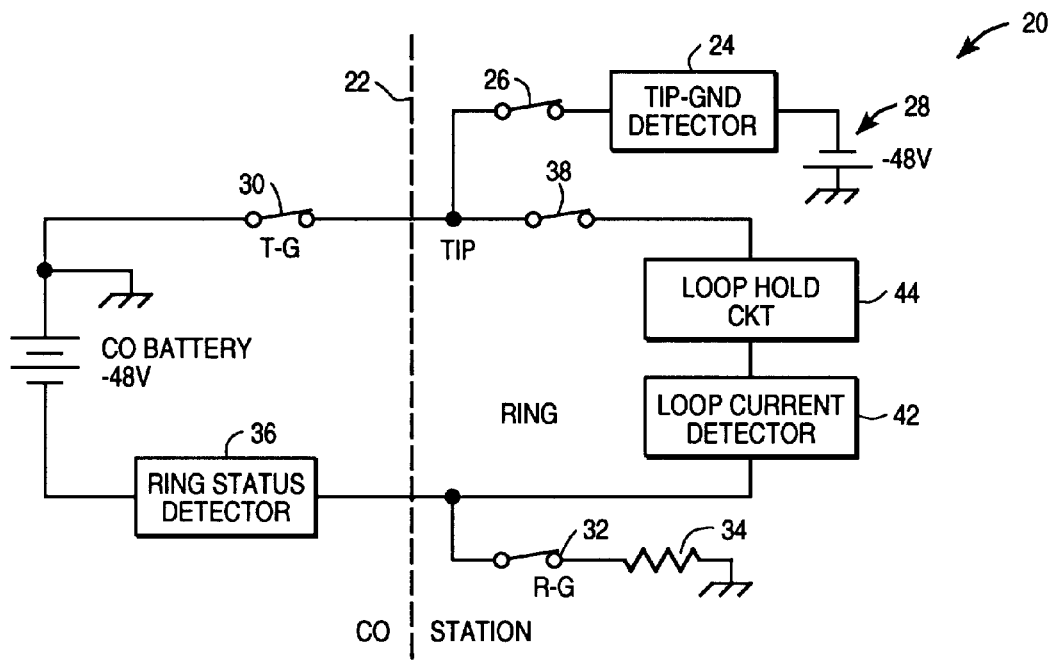
(PRIOR ART)
FIG_1
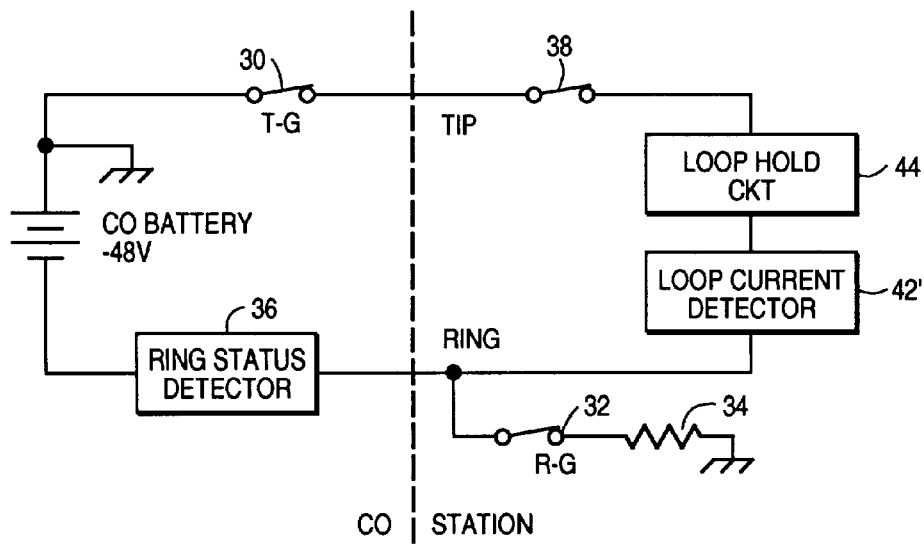
FIG_2

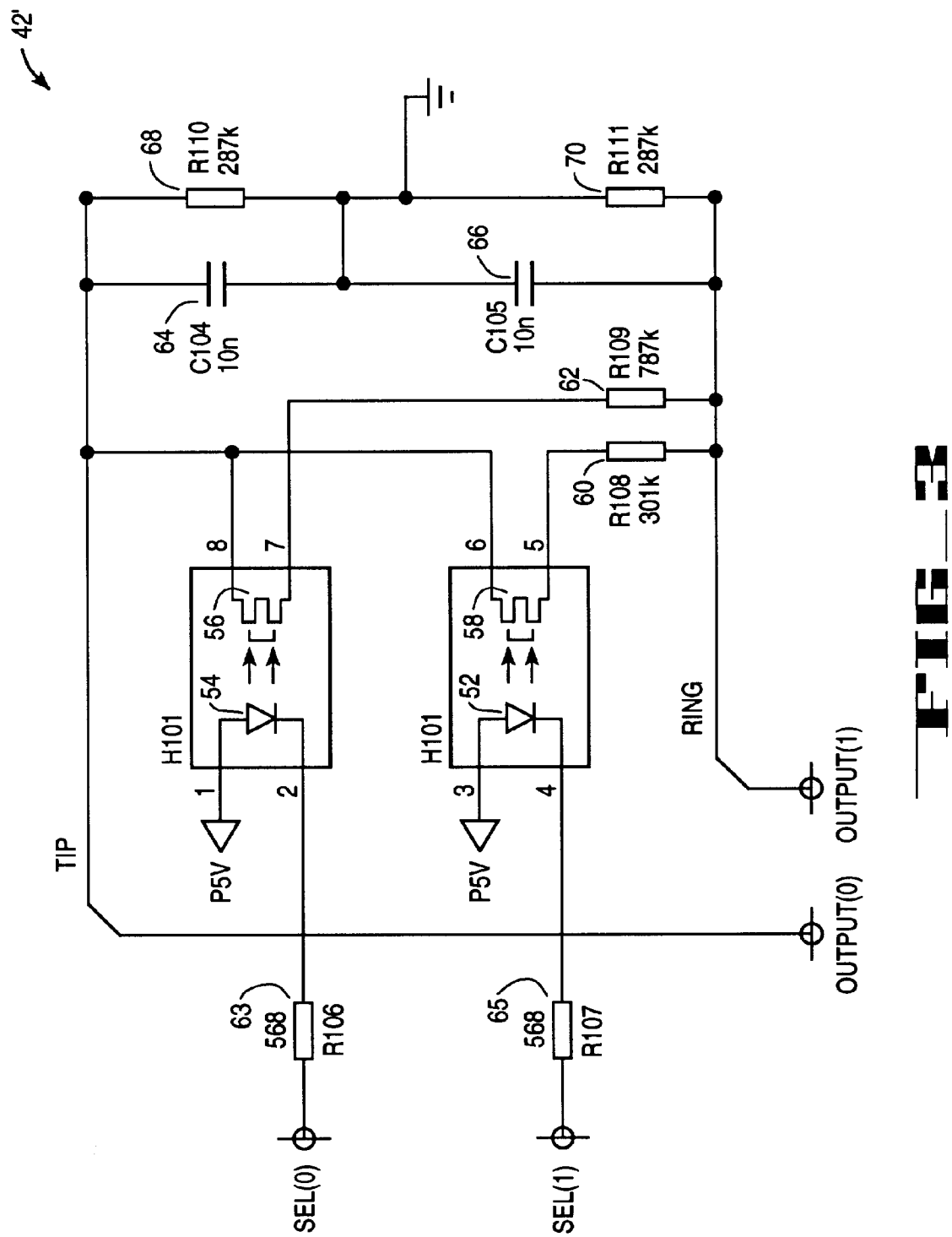
FIG_3

GROUND START AND TIP GROUND DETECTION WITHOUT THE USE OF -48V OR TIP BAIT CIRCUIT

BACKGROUND OF THE INVENTION

1. Field of the Invention

The present invention relates to a telephone circuit and more particularly to a telephone circuit for detecting the loop current of a subscriber handset in a ground start mode and a normal mode which obviates the need for a separate TIP ground detector circuit and associated −48V supply to detect the subscriber handset off-hook status.

2. Description of the Prior Art

In known telephone systems, the on-hook/off-hook status of the subscriber handset is monitored. When the subscriber handset is off-hook, the off-hook status of the subscriber handset is used to enable the system to provide a dial tone to the handset as well as block incoming calls and provide a busy signal to any incoming callers. When the subscriber handset is on-hook the system is able to direct incoming calls to the subscriber handset as well as provide for ringing until the subscriber handset goes to an off-hook condition in which case the incoming call is connected to the subscriber handset.

FIG. 1 is an example of a known ground start telephone circuit, generally identified with the reference numeral 20. The dotted line 22 is used to show the division of circuitry between the subscriber handset and the central office. An outcall is typically initiated when the subscriber handset is off-hook. Initially a TIP ground detector circuit 24 (also known as a TIP bait circuit) is connected to a TIP conductor by way of a hook switch 26 that is closed when the subscriber handset is off-hook. The TIP ground detector 24 is connected to ground by way of a −48V power supply 28. If the TIP ground detector 24 detects that the TIP conductor has been grounded by way of a TIP ground switch 30 at the central office, an incoming call is pending and the outcall is aborted. Assuming there are no incoming calls, the switch 30 will be open.

Initially during a ground start mode of operation, the hook status of the subscriber handset during an outcall causes the RING conductor initially to be grounded by way of a hook switch 32 and a (optional) grounding resistor 34. Once the RING conductor is grounded at the subscriber handset, a RING status detector 36 at the central office detects the ground and closes the TIP ground switch 30. Once the TIP ground switch 30 is closed, the TIP ground detector 24 recognizes the ground and closes a switch 38 at the subscriber handset to enable the loop-hold circuit 40 to complete the loop between the subscriber handset and the central office. Once the loop-hold circuit 40 is enabled, the hook switches 26 and 32 are opened and a normal mode of operation is established. A loop current detector circuit 42 is used to measure loop current. After the loop current is detected by the loop current detector 42, the hook switches 26 and 32 are opened. The central office sends a dial tone and later establishes a voice connection with the subscriber handset.

As discussed above, the TIP ground detector circuit 24 is used to determine hook status to enable an outgoing subscriber handset to place an outgoing call or to receive an incoming call. As illustrated in FIG. 1, such a TIP ground detector circuit 24 is a separate circuit which requires a −48V supply. Unfortunately such a supply may not always be available. Moreover, the TIP ground detector circuitry 24 adds to the complexity of the overall system.

Circuitry has been developed which eliminates the need for a −48V supply, for example as described and illustrated in U.S. Pat. No. 4,282,408. In that system, a separate circuit is provided which includes a light emitting diode (LED) connected directly between the TIP and RING conductors of a subscriber handset circuit. The anode of the LED is connected to a power supply by way of a current limiting resistor while the cathode is connected to ground by way of a resistor. During an on-hook condition, the light emitting diode signals a phototransistor of the on-hook status of the subscriber telephone set. Once the subscriber telephone set goes off-hook, the circuit is configured so that the LED is shorted thereby eliminating the signal from the phototransistor. While such a circuit provides for the on-hook/off-hook status of the subscriber handset, such a system requires a separate circuit and thus adds to the overall complexity and cost of the system.

SUMMARY OF THE INVENTION

It is an object of the present invention to solve various problems in the prior art.

It is another object of the present invention to reduce the complexity of telephone circuits.

Briefly, the present invention relates to a circuit for measuring the loop current in a telephone circuit during a ground start mode as well as during a normal condition. A pair of light emitting diodes (LED) are associated with a photoelectric device, such as a phototransistor, connected across TIP and RING with a series resistor. The value of the resistors are selected such that TIP-RING voltages can be scaled properly and fed to a fixed threshold loop voltage detector when the subscriber unit is initially off-hook (i.e., ground start condition) and a normal condition. The inputs to the LEDs are programmable to enable the loop current to be detected in both a ground start condition as well as a normal condition. As such, with such configuration, a separate circuit is not required for detecting the off-hook status of a subscriber handset in a ground start mode of operation.

DESCRIPTION OF THE DRAWINGS

These and other objects of the present will be readily understood with reference to the following specification and attached drawings wherein:

FIG. 1 is a block diagram of a known ground start telephone system which utilizes a TIP ground circuit and associated −48V supply;

FIG. 2 is a block diagram of a ground start telephone circuit in accordance with the present invention utilizing an off-hook detector in accordance with the present invention; and FIG. 3 is a schematic diagram of the threshold selector for the off-hook detector circuit in accordance with the present invention.

DETAILED DESCRIPTION

The present invention relates to a circuit for detecting the loop current in a telephone circuit in both a ground start mode and a normal mode which obviates the need for a separate circuit for detecting the on-hook/off-hook status of a subscriber handset and as well as the need for a −48 volt supply. The present invention includes a pair of programmably selectable light emitting diodes (LEDs) connected between the TIP and RING conductors of a subscriber handset. A photoelectric device, such as a phototransistor is associated with each of the LEDs. Each of the phototransistors is connected to a resistor. The size of these resistors connected to the phototransistors may be selected to provide a properly scaled TIP-RING voltage to the loop detector during an off-hook condition in both ground start mode and normal loop mode.

Turning to FIG. 2, a block diagram of a telephone circuit in accordance with the present invention is illustrated. In this embodiment like components are identified with like reference number numerals relative to FIG. 1. An important aspect of the present invention is the elimination of the TIP ground detector 24 and the −48V supply 28. As will be discussed in more detail below the loop current detector 42' in accordance with the present invention is able to detect loop current during both a ground start mode as well as a normal mode thus obviating the need for a separate TIP ground detector circuit.

As discussed above, the RING conductor is grounded through a finite resistor 34 by way of the switch 32. The resistor 34 may be, for example, less than 560 ohms. Since the RING conductor is grounded through a finite resistor, the RING conductor during such a condition will be at a voltage level between 0 and −48V, depending on the value of the resistor 34, the battery voltage and the loop resistance. When the TIP conductor is opened by way of the switch 38 being open, no loop current will flow between the TIP and RING conductors. However, when the TIP conductor is grounded by way of the switch 30 and switch 38 is closed, a relatively small loop current will flow between the TIP and RING conductors. The loop current during such a condition is relatively smaller than the resulting loop current when the switch 32 is opened and the RING conductor is not grounded. In accordance with the present invention, the loop current detector circuit 42' is adapted to detect both levels of loop currents. As such, a separate TIP ground detector (TIP bait circuit) and −48V supply are unnecessary.

Referring to the circuit illustrated in FIG. 2, the switch 38 is closed when the subscriber wants to initiate an out-call. If loop current is detected by the loop current detector 42', the system assumes that the TIP circuit has already been grounded by the central office (i.e., the TIP ground switch 30 is closed by the central office) indicating an incoming call. If there is no loop current indicating that the TIP ground switch 30 is open, then switch 32 is closed, and the ring status detector 36 at the central office responds, as discussed above, by closing the TIP ground switch 30 to cause loop current to flow between the TIP and RING conductors. During such a condition (i.e., ground start mode), the loop current detector 42', as will be described below, is adapted to detect relatively low loop current. If no loop current is detected within a predetermined time limit the outcall is aborted. If low loop current is detected by the loop current detector, the hook switch 32 is opened and the loop current detector 42' is programmed for normal operation as discussed below. Afterward, the dial tone and voice connection is established. If either party to the call hangs up, the other party will detect a loss of loop current.

The method of changing the detect threshold of the loop current detector circuit 42' in accordance with the present invention is illustrated in FIG. 3. As mentioned above, the loop current detector circuit 42' includes a pair of LEDs 52 and 54 and corresponding photoelectric devices, such as the phototransistors 56 and 58, respectively. The drain and source terminals of the phototransistors 56 and 58 are connected between the TIP and RING conductors by way of resistors 60 and 62, respectively. The anodes of each of the LEDs 52 and 54 are connected to a 5 volt supply P5V. The cathodes of the LEDs 52 and 54 are connected to select inputs SEL(0) and SEL(1) by way of a pair of current limiting resistors 63 and 65. The select inputs SEL(0) and SEL(1) are digital inputs. Thus, when a logical 1 or 5 volts is connected to the cathode of the diodes 52 and 54, no current flows and thus the phototransistors remain off. When logical zero is connected to one of the select inputs SEL(0) or SEL(1), current flows through the respective LED 52 or 54 causing light to be generated and received by the corresponding phototransistors 56 and 58 and they are turned on. The LEDs 52 and 54 are thus programmably selectable to allow the loop detection circuit 42' to detect loop current in a ground detection mode as discussed above and a normal mode and provide, for example, voltage outputs at the output terminals OUTPUT(0), OUTPUT(1). By providing different values for the resistors 60 and 62, the loop current detector 42' is thus scalable to enable different levels of loop currents to be sensed.

More specifically, the value of the resistors 60 and 62 may be selected to provide, for example, a 5 volt output for the two circuit conditions. In a ground start mode when relatively low loop current is expected, the LED 54 and corresponding phototransistor 56 is selected. In this mode, the value of the resistor 62 is selected to cause during such low loop current conditions a predetermined, for example, 5 volt, voltage drop across the resistor 62 will indicate an off-hook status in the ground start mode. In a normal current mode, the LED 52 and phototransistor 58 is selected. The value of the resistor 60 is selected to provide a nominal 5 volt drop for the executed loop current during a normal condition.

A pair of serially connected capacitors 64 and 66 are connected across the TIP and RING conductors. The junction between the capacitors 64 and 66 is grounded to stabilize the voltage between the TIP and RING conductors and ground during a ground start mode of operation. A resistor 68, 70 is connected across each capacitor 64 and 66 to discharge the capacitors 64 and 66 in a normal mode of operation.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A loop current detector for a telephone circuit connected to a telephone company central office circuit having TIP and GROUND conductors forming a current loop connected to a central office power supply said detector having a ground start mode when one or both of said TIP and GROUND conductors are grounded and a normal mode when said TIP and GROUND conductors are not grounded, the detector comprising:

a first circuit configured to detect the current in said current loop in the ground start mode; and a second circuit configured to detect the current in said current loop in the normal mode;

said first and second circuits adapted to detect one or more loop current levels as a function of the power supply voltage at said central office and the loop resistance in said current loop.

2. The loop current detector as recited in claim 1, wherein said first circuit includes a first light emitting diode (LED) and a first photoelectric device.

3. The loop current detector as recited in claim 2, wherein said second circuit includes a second LED and a second photoelectric device.

4. The loop current detector as recited in claim 1, wherein said first circuit is programmable.

5. The loop current detector as recited in claim 4, wherein said second circuit is programmable.

6. A loop current detector for a telephone circuit having TIP and GROUND conductors forming a current loop connected to a central office power supply defining a ground start mode when one or both of said TIP and GROUND conductors are grounded and a normal mode when said TIP and GROUND conductors are not grounded, the detector comprising:

a first light emitting diode (LED) connected between a predetermined voltage source and a first predetermined input;

a first detection circuit electrically coupled to said TIP and RING conductors configured to provide a first predetermined electric signal when said first LED is conducting when said first predetermined input is selected;

a second LED connected between a predetermined voltage source and a second predetermined input; and a second detection circuit including a second photoelectric device electrically coupled to said TIP and RING conductors configured to provide a second predetermined electric signal when said second LED is conducting when said second predetermined input is selected, said current loop detection circuit responsive to said first and second detection circuits, adapted to enable said current loop detection circuit to be scalable, thereby enabling detection of different levels of loop current, and said first and second predetermined inputs being selectable as a function of whether the circuit is in a ground mode or normal mode.

7. The loop current detector as recited in claim 6, wherein said first predetermined input is a digital input.

8. The loop current detector as recited in claim 6, wherein said second predetermined input is a digital input.

9. The loop current detector as recited in claim 6, wherein said first means is configured to provide a predetermined output signal during a ground start mode of operation.

10. The loop current detector as recited in claim 6, wherein said first means is configured to provide a predetermined output signal during a normal mode of operation.

11. The loop current detector as recited in claim 6, wherein said first photoelectric device is a phototransistor having drain and source terminals.

12. The loop current detector as recited in claim 11, wherein said first means includes a first resistor, serially connected to one or the other said drain and source terminals of said phototransistor.

13. The loop current detector as recited in claim 12, wherein the value of said resistor is selected to provide a predetermined voltage output.

14. The loop current detector as recited in claim 6, wherein said second photoelectric device is a phototransistor having drain and source terminals.

15. The loop current detector as recited in claim 11, wherein said second means includes a second resistor, serially connected to one or the other said drain and source terminals of said phototransistor.

16. The loop current detector as recited in claim 12, wherein the value of said second resistor is selected to provide a predetermined voltage output.

* * * * *